(12) United States Patent
Sexauer et al.

(10) Patent No.: US 9,303,407 B2
(45) Date of Patent: *Apr. 5, 2016

(54) HIGHLY REFLECTIVE ROOFING SYSTEM

(71) Applicant: National Coatings Corporation, Camarillo, CA (US)

(72) Inventors: Eric L. Sexauer, Camarillo, CA (US); Matthew W. Kolb, Camarillo, CA (US)

(73) Assignee: National Coatings Corporation, Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,570

(22) Filed: Oct. 3, 2014

(65) Prior Publication Data

US 2015/0259922 A1  Sep. 17, 2015

Related U.S. Application Data

(63) Continuation of application No. 12/857,948, filed on Aug. 17, 2010, now Pat. No. 8,865,303.

(60) Provisional application No. 61/248,285, filed on Oct. 2, 2009.

(51) Int. Cl.
*E04D 7/00* (2006.01)
*E04D 5/12* (2006.01)

(52) U.S. Cl.
CPC ........ *E04D 7/005* (2013.01); *E04D 5/12* (2013.01); *Y02B 80/34* (2013.01); *Y10T 428/2443* (2015.01); *Y10T 428/24388* (2015.01); *Y10T 428/249982* (2015.04); *Y10T 428/249985* (2015.04); *Y10T 428/25* (2015.01); *Y10T 428/252* (2015.01)

(58) Field of Classification Search
None
See application file for complete search history.

(56) References Cited

U.S. PATENT DOCUMENTS

| 3,227,675 | A | * | 1/1966 | Papalos | 524/114 |
| 4,507,336 | A | * | 3/1985 | Cenegy | 427/244 |
| 2007/0110961 | A1 | * | 5/2007 | Fensel et al. | 428/143 |
| 2011/0086201 | A1 | * | 4/2011 | Shiao et al. | 428/148 |

* cited by examiner

*Primary Examiner* — Ronak Patel
(74) *Attorney, Agent, or Firm* — Ben J. Yorks; Irell & Manella LLP

(57) ABSTRACT

A cool roofing system includes highly reflective calcined kaolin particles having a solar reflectance of 80% to 92%. When applied to a roofing substrate, the highly reflective kaolin particles produce a roofing system having a solar reflectance greater than or equal to 70%.

16 Claims, 1 Drawing Sheet

HIGHLY REFLECTIVE ROOFING SYSTEM

CROSS-REFERENCE TO RELATED APPLICATION

This application is a continuation of U.S. patent application Ser. No. 12/857,948, filed Aug. 17, 2010 and claims the benefit under 35 U.S.C. §119 of U.S. Provisional Application No. 61/248,285, filed on Oct. 2, 2009, which are herein incorporated by reference as if set forth fully herein.

TECHNICAL FIELD

The present invention relates to cool roofing systems. More particularly, the present invention relates to a cool roofing system including highly reflective particles that can be applied to a substrate to increase the solar reflectance of a roofing system to equal to or greater than 70%.

BACKGROUND

Title 24 of the California Code of Regulations, and similar requirements of other agencies, require the solar reflectance of commercial roofing materials to be a minimum of 70%. Many current roofing materials, such as asphalt and modified bitumen, are black in color and have very low solar reflectance. Most of these black roofing materials use mineral granules on the surface to reduce weathering and add fire resistance. Most current roofing granules for asphalt and other dark colored roofing materials are made from crushed rock such as feldspar, which are coated with a ceramic coating in order to make them white enough to achieve an acceptable solar reflectance. However, despite these efforts, the granules that are commercially available today are not bright enough to increase the solar reflectance of the black materials to meet the 70% standard.

SUMMARY

In some embodiments, the present invention is a cool roofing system which includes at least one asphalt layer and at least one granular layer including a plurality of highly reflective calcined kaolin particles having a reflectance ranging from about 80% to about 92% adhered to the asphalt layer. The cool roofing system has a minimum solar reflectance of 70% and, more particularly, a solar reflectance ranging from about 70% to about 82%.

According to various other embodiments, the present invention is a cool roofing system including a roofing substrate, at least one layer of spray polyurethane foam applied to the roofing substrate such that it has a thickness ranging from about one inch to about three inches, an elastomeric coating layer applied over and adhered to the spray polyurethane foam layer, and a plurality of highly reflective, white calcined kaolin particles having a reflectance ranging from about 80% to about 92% adhered to the elastomeric coating layer. The cool roofing system has minimum solar reflectance of 70% and, more particularly, a solar reflectance ranging from about 70% to about 82%.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Figure 1:
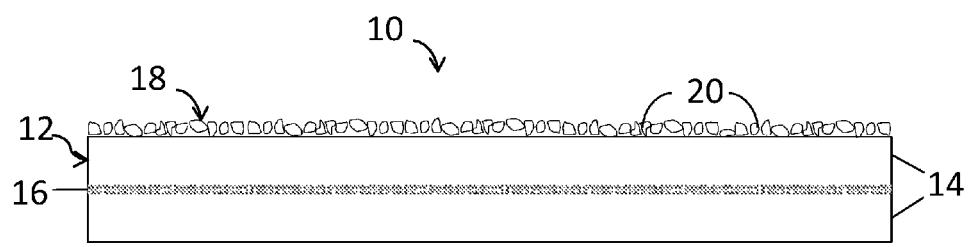
FIG. 1 is a schematic view of a cool roofing system according to an embodiment of the present invention.

Various materials have been investigated that may be used to make a roofing granule or particle that when applied to a roofing substrate might achieve a highly reflective roofing surface. These various materials include white quartz, tabular alumina, ceramic sand, and calcined clay from a variety of sources globally. When applied to a black roofing substrate, none of these materials were found to meet the desired 70% solar reflectance standard. White quartz, for example, lacked the necessary opacity to provide sufficient protection to the roofing substrate from the sun's ultra-violet rays. Tabular alumina was extensively tested for its reflectivity and other properties, but the results were not satisfactory. Calcined clay from a variety of sources was investigated and was found not to produce a high enough solar reflectance when applied to a roofing substrate. Ceramic sand which is made from pieces of white porcelain and ground into particles of the desired size was also tested. Like the other materials that were investigated, ceramic sand, when applied to an asphalt roofing substrate, also failed to meet the 70% solar reflectance standard.

Roofing materials and systems containing reflective particles and processes for making the same are generally shown and described in U.S. Pat. No. 7,291,358 and U.S. Published Application No. 2004/0017938, both of which are incorporated herein by reference in their entirety for all purposes.

A cool roofing system according to the various embodiments of the present invention includes highly reflective calcined kaolin particles producing a roofing system having a minimum solar reflectance of 70%. Calcined kaolin is known and referred to as kaolin chamotte, aluminum silicate, calcined clay, calcined china clay, mullite and calcined flint clay. There are many different sources of calcined kaolin found throughout the world. Most calcined kaolin sourced from a variety of locations is off-white, tan or light grey in color. However, there are a few unique sources in the world where there are deposits of kaolin that produce extremely bright white and highly reflective calcined kaolin. These unique sources are found in China and in Central/Eastern Europe.

The kaolin mined in China and Central/Eastern Europe is calcined at temperatures between 1100° C. and 1600° C. to improve the whiteness and hardness of the kaolin clay material. This unique kaolin clay is ground or crushed into granules having an approximate size ranging from 0.3 mm to 2.4 mm and its solar reflectance determined. The solar reflectance of these unique kaolin clay particles ranges from 80% to 92%. When applied to a black roofing substrate at the rate normally used for roofing materials, the resultant reflectance was between 70% and 82%.

One example of highly reflective calcined kaolin that is suitable for use in the various embodiments of the present invention is Kaolinchamotte AS 45 obtained from Amberger Kaolinwerke located in Hirschau and Schnaittenbach, Germany.

FIG. 1 is a schematic drawing of a cool roofing system 10 according to one embodiment of the present invention. The cool roofing system 10 includes at least one asphalt layer 12 such as a layer of bitumen or modified bitumen. Bitumen or modified bitumen can be composed of one or more asphalt layers 14 and one or more layers of a reinforcing material 16 such as, for example, polyester or fiberglass.

The upper asphalt layer 12 includes at least one granular layer 18 including a plurality of highly reflective calcined kaolin particles 20 adhered to or embedded within a top surface of the asphalt layer 12. According to various embodiments, the highly reflective calcined kaolin particles have a solar reflectance ranging from about 80% to about 92% such that when applied to the reinforced asphalt layer 12 result in a roofing system having a minimum solar reflectance of 70% and, more particularly, a solar reflectance ranging from about 70% to about 82%. The particles 20 are bright white in color and have a size ranging from about 0.3 mm to about 2.4 mm. In one embodiment, the particles 62 are of substantially the same particle size distribution. For example, the particles 62 have a particle size distribution that corresponds to the following:

Grade: (ASTM D451)

| U.S. Sieve No. | Nominal Opening | % Retained Specification | |
|---|---|---|---|
| | | Minimum | Maximum |
| 8 | 2.36 mm | 0.0 | 0.1 |
| 12 | 1.70 mm | 4.0 | 10.0 |
| 16 | 1.18 mm | 30.0 | 45.0 |
| 20 | 850 µm | 25.0 | 35.0 |
| 30 | 600 µm | 15.0 | 25.0 |
| 40 | 425 µml | 2.0 | 9.0 |
| >40 | >425 µm | 0.0 | 2.0 |

*Typical range

The cool roofing system 10 including the asphalt layer is produced by passing a reinforcement material 16, such as fiberglass or polyester, through hot liquid asphalt, which impregnates and coats the reinforcement material 16. This coated strip is then run under a hopper which dispenses the calcined kaolin particles 20 onto the upper surface of the hot asphalt coated strip to substantially fully cover the surface. This strip is then passed over a roller or drum to flatten the particles 20 and press them into the asphalt included in the reinforced asphalt layer 12. The roofing material can be provided in the form of individual shingles or sheets which can then be applied to any commercial, industrial low or steep slope roofing surface.

Figure 2:
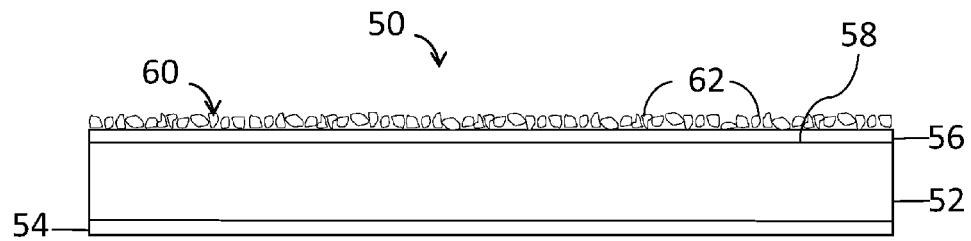
FIG. 2 is a schematic view of a cool roofing system according to another embodiment of the present invention.

FIG. 2 is a schematic drawing of a cool roofing system 50 according to another embodiment of the present invention. The cool roofing system 50 shown in FIG. 2 includes at least one layer of spray polyurethane foam 52 applied to a roofing substrate 54. The roofing substrate 54 can be an exposed roofing surface of a structure or sheets or layers of a roofing material. For example, in one embodiment, the layer of spray polyurethane foam 52 can be applied directly onto a roofing surface of a building. In other embodiments, the spray polyurethane foam layer 52 can be applied to a variety of surfaces including concrete, wood, gravel, asphalt, built-up roofing (BUR), modified bitumen, single ply membranes and the like. In one embodiment, the spray polyurethane foam layer 52 can be applied over another spray polyurethane foam layer. A thickness of the spray polyurethane foam layer typically ranges from about 1 inch to about 3 inches.

Additionally, the cool roofing system 50 depicted in FIG. 2 includes at least one layer of an elastomeric coating 56. The elastomeric coating 56 is applied to the upper surface 58 of the spray polyurethane foam layer 52 within 24 hours to protect the spray polyurethane foam from UV light damage. In one embodiment, the elastomeric coating 56 is applied to the upper surface of the spray polyurethane foam layer 52 such that it substantially coats the entire surface of the spray polyurethane foam layer 52. The elastomeric coating can be formed from a wide variety of elastomeric materials including, but not limited to acrylics, urethanes, and silicones.

The cool roofing system 50 also includes at least one granular layer 60. The granular layer 60 includes a plurality of highly reflective calcined kaolin particles 62, such as those described above, adhered to or embedded within the elastomeric coating layer 56. The particles 62 are white in color and can range in size from about 0.3 mm to about 2.4 mm. In one embodiment, the particles 62 are of substantially the same size. Additionally, the highly reflective calcined kaolin particles have a solar reflectance ranging from about 80% to about 92% that when applied to the reinforced asphalt layer 12 results in a roofing system having a minimum solar reflectance of 70% and, more particularly, ranging from about 70% to about 82%.

In one embodiment, the cool roofing system 50 is produced by applying at least one layer of spray polyurethane foam to a roofing substrate such as a roof surface, and then coating the spray polyurethane foam layer with an elastomeric coating layer. While elastomeric coating layer is still wet, calcined kaolin granules are then applied to the coating.

In some embodiments, the calcined kaolin particles used in the roofing systems, as described above, can include a coating and/or a surface treatment. The calcined kaolin particles can be coated and/or their surfaces treated for any number of reasons including dust control, to enhance and/or increase water repellency and to prevent various kinds of staining.

Various compounds can be used to coat or treat the surface the calcined kaolin particles described above according to the various embodiments of the present invention. These compounds include, but are not limited to the following: silanes, siloxanes, polysiloxanes, organo-siloxanes, silicates, organic silicates, silicone resins, acrylics, urethanes, polyurethanes, glycol ethers and mineral oil. Table 1 provides a list of exemplary commercially available coatings and surface treatments and their general descriptions that can be used to coat or treat the surface of calcined kaolin particles or other roofing particles. Additional, exemplary coatings, surface treatments, and methods of coating and treating particles are shown and described in U.S. Pat. No. 7,241,500, U.S. Pat. No. 3,479,201, U.S. Pat. No. 3,255,031, and U.S. Pat. No. 3,208,571, all of which are incorporated herein by reference in their entirety for all purposes.

TABLE 1

| Coating/Surface Treatment | Description | Manufacturer |
|---|---|---|
| Salt Water Resistant Sealer* | Deionized water, alkylalkoxysilanes, siloxanes, alcohol, ethoxylate | DuPont |
| Maximum Bullet Proof Sealer* | Deionized water, mixed fluoroalkyl salts, propylene glycol monobutyl ether | DuPont |
| Heavy Duty Sealer* | Deionized water mixed fluoroalkyl salts, propylene glycol, monobutyl ether | DuPont |
| Heavy Duty Exterior Sealer* | Aliphatic hydrocarbons, proprietary silicone resin, alkyl alkoxysilane, methanol | DuPont |
| Impregnator Pro* | Aliphatic hydrocarbons, butyl acetate, fluorinated acrylic copolymer, fragrance | DuPont |
| Rich Color Enhancer Pro* | Aliphatic hydrocarbons, proprietary silicone resin, alkyl alkoxysilane, methanol, butyl acetate | DuPont |

TABLE 1-continued

| Coating/Surface Treatment | Description | Manufacturer |
|---|---|---|
| AcryShield (Bl A130 | Proprietary acrylic formulation | National Coatings Corporation |
| AcryShield ® A179-X628 | Proprietary acrylic formulation | National Coatings Corporation |
| QW77 | Urethane | Henkel Corporation |
| Water-based polyurethanes | Polyurethane | Minwax Corporation |
| Sitren ® 595 | Polydimethylsiloxane emulsion | Evonik Corporation |
| Sitren ® 270 | Aqueous emulsion based on reactive organo-siloxanes | Evonik Corporation |
| SILRES ® BS1011A | Water-thinable, solventless emulsion based on a mixture of silane and siloxane | Wacker Chemie AG |
| SILRES (Bl BS3003 | Water-thinable, solventless emulsion based on a mixture of silane and siloxane | Wacker Chemie AG |
| Tego XP 5000 | Emulsion of silicone resins | Evonik Goldschmidt Corporation |
| Kynar RC-10, 147 | Acrylic copolymer, vinylidine fluoride copolymer | Arkemainc. |
| RHOPLEX ™ EC 2540 | 100% acrylic polymer | The Dow Chemical Company |
| Sycoat 235 | Acrylic copolymer emulsion | Saiden Technologies |

*Marketed under the StoneTech_(g) Professwnal brand

To maintain the high solar reflectance of the calcined kaolin particles, the coating and/or surface treatment should be applied to the calcined kaolin particles such that the coating and/or surface treatment does not significantly decrease the reflectance of the calcined kaolin particles. For example, many of the coatings and/or surface treatments are sealants or otherwise clear coatings that do not adversely affect the overall solar reflectance of the calcined kaolin particles. In one embodiment, the calcined kaolin particles are treated with an emulsion of silanes and siloxanes without added solvents. In another embodiment, the calcined kaolin particles are treated with SILRES BS3003.

The surface treatments and/or coatings can be applied to calcined kaolin particles using a variety of methods and processes known to those of skill in the art. For example, in one exemplary embodiment, after the raw material has been crushed and sized according to the preferred screen size and packaged, the particles can be treated by adding the particles to an aqueous solution fully saturating the particles with the treatment and then, immediately drying the particles to drive off excess moisture at a temperature not exceeding 600° F. In another exemplary embodiment, after the raw material has been crushed and sized according to the preferred screen size and packaged, the particles can be post treated by spraying the particles with an aqueous solution and then immediately drying the particles to drive off excess moisture at a temperature not to exceed 600° F. In yet another exemplary embodiment, after the raw material has been crushed and sized according to the preferred screen size, the particles can be treated by spraying the particles with an aqueous solution and then immediately kiln drying the particles to drive off excess moisture at a temperature not to exceed 600° F. after which time they can be packaged. In still yet another embodiment of coating and/or treating the surface of calcined kaolin particles, after the raw material has been crushed and sized according to the preferred screen size, the particles are treated by spraying with an aqueous solution followed by immediately aerating the particles to drive off excess moisture after which time the particles can be packaged. The coatings and/or surface treatments may be applied as delivered (e.g., off the shelf) or from aqueous dilutions. The dilution ratio may range from 1:5 to 1:200. The dilutions may be prepared from demineralized water.

EXAMPLE

Example 1

Treated Granule Preparation

The method of sample preparation for laboratory testing was as follows. A small plastic or glass container was placed on a digital scale, and the scale zeroed. Approximately 1 oz. (approximately 29.5 ml or 35 grams) of the treatment solution to be tested was placed into the container. The scale was then re-zeroed. 100 grams of calcined kaolin roofing granules was added to the container. The container was then closed with a lid. The container containing the calcined kaolin roofing granules and the treatment solution was vigorously agitated to ensure complete coverage of the granules by the treatment. Next, the treated granules were removed and evenly spread out on a foil tray. The tray containing the treated granules was placed into an oven preheated to 80° C. and the treated granules were dried overnight. The treated granules were removed from the oven and allowed to cool for several hours. The objective of cooling the treated granules was to ensure that the granules return to an ambient or equalized humidity as they might be found prior to a production run of the product.

A brief description of each of the different granules and treatments appear in Table 2 below.

TABLE 2

| | Description | Manufacturer |
|---|---|---|
| Granule #1 | WA-14 calcined kaolin particle having a reflectivity ranging from 70 to 92%. | Sedlecky Kaolin (Bozicany, Czech Republic) |
| Granule #2 | WA-11 calcined kaolin particle having a reflectivity ranging from 70 to 92%. | AKW (Hirschau, Germany) |
| Treatment #1 | SITREN 595 | Evonik Industries AG (Essen, Germany) |
| Treatment #2 | TEGO XP 5000 | Evonik Industries AG (Essen, Germany) |
| Treatment #3 | SILRES BS1001A | Wacker Chemie AG (Munich, Germany) |
| Treatment #4 | SILRES BS3003 | Wacker Chemie AG (Munich, Germany) |

Example 2

Reflectivity

Reflectivity of each of the treated samples was measured using a D&S Reflectometer, Model SSR-ER Version 6 (Devices and Services Company, Dallas, Tex.). To carry out the measurement using the reflectometer, about 100 g of treated sample was placed onto a sample receiving dish. The sample was smoothed out such that the surface of the sample in the dish was roughly level. The reflectometer was cycled through each measurement cycle 1-2 times for each measurement location. A total of five measurements locations were used. The measurement locations represented the four points on a compass (north, south, east and west), with the fifth measurement taken at the center of the sample dish. The reflectivity readings at each of the five measurement locations were averaged together to obtain an average reflectivity for each individual treated sample. The average reflectivities of each of the treated samples are presented in Table 3 below.

TABLE 3

| Sample | Reflectivity |
| --- | --- |
| Granule #1, Treatment #1 | 82.3% |
| Granule #1, Treatment #2 | 82.5% |
| Granule #1, Treatment #3 | 82.5% |
| Granule #1, Treatment #4 | 82.4% |
| Granule #1, Untreated | 83.9% |
| Granule #2, Treatment #1 | 82.5% |
| Granule #2, Treatment #2 | 83.2% |
| Granule #2, Treatment #3 | 83.4% |
| Granule #2, Treatment #4 | 83.7% |
| Granule #2, Untreated | 83.7% |

Example 3

Water Repellency Test

The water repellency is a quality control test frequently used in the roofing granule industry. It is important to have hydrophobic roofing granules because hydrophilic granules may exhibit difficulty in being adhered to an asphalt-based substrate. When roofing granules are applied to an asphalt-based substrate, water may then be sprayed on the hot asphalt to cool the heated substrate. If the roofing granules are hydrophilic, water may be present between the granules and the substrate, thereby hindering granule adherence to the asphalt-based substrate.

Each of the granules used in the water repellency test was treated with a solution according to the method described above such that the weight of the treatment solution to the weight of the granules was 2% by weight. Products treated with SILRES BS3003 were treated using a 0.67% dilution. The 0.67% dilution was prepared by weighing 45 g of deionized water into a container and into the same container, weighing 2.50 g of SILRES BS3003. The mixture was gently swirled to form a diluted emulsion. The diluted SILRES BS3003 was then applied to the granules. A brief description of each of the samples is provided in Table 4 below.

TABLE 4

| Sample | Coating and/or Treatment | Granule |
| --- | --- | --- |
| a | SITREN 595 | WA-11 |
| b | TEGO XP 5000 | WA-11 |
| c | SYCOAT 235 | WA-11 |
| d | SILRES BS 1001A | WA-11 |
| e | ACRYSHIELD A130 | WA-11 |
| f | ACRYSHIELD A179-X628 | WA-11 |
| g | EC 2540 | WA-11 |
| h | KYNAR R-10 147 | WA-11 |
| i | SITREN 595 | WA-14 |
| j | TEGO XP 5000 | WA-14 |
| k | SILRES BS1001A | WA-14 |
| l | SILRES BS3003 | WA-14 |
| m | SILRES BS3003 | WA-11 |

WA-11 is a calcined kaolin granule supplied by AKW of Hirschgau, Germany. The reflectivity of WA-11 ranges from about 80% to 92%. WA-14 is a calcined kaolin particle supplied by Sedlecky Kaolin of Bozicany, Czech Republic. The reflectivity of WA-14 ranges from about 80% to 92%.

Water repellency was measured by placing three drops of distilled water from an eye dropper onto a 25 gram pile of treated roofing granules. The drops were placed in a depression that had been made in the center of the pile of granules. The three drops of distilled water formed a bead in the depression. A measurement was taken for the amount of time it takes for the bead to break up and sink down through the granules. Longer times indicate better hydrophobicity. The water repellency test results for each of the treated samples are presented in Table 5 below.

TABLE 5

| Sample | Time to Water Absorption |
| --- | --- |
| a | >120 min |
| b | >120 min |
| c | <1 min |
| d | >120 min |
| e | <1 min |
| f | <45 min |
| g | <10 min |
| h | <1 min |
| i | >120 min |
| j | >120 min |
| k | >120 min |
| l | >120 min |
| m | >120 min |

The samples treated with SITREN 595, TEGO XP 5000 and SILRES BS 1001A showed more favorable water repellency test results. The sample treated with SILRES BS3003 produced superior results.

Example 4

4-Day Stain Test

The 4-Day Stain Test is another quality control test frequently used in the roofing granule industry. The 4-Day Stain Test is an accelerated measurement of the tendency of roofing granules to adsorb asphaltic oils in an asphalt-based substrate. Each of the granules used in the 4-Day Stain test was treated with a solution according to the method described above such that the weight of the solution to the weight of the granules was 2% by weight. A brief description of each the different granules, treatments and asphalt types used to create each of the samples used evaluated using the 4-Day Stain Test is provided in Table 6 below.

TABLE 6

| | Description | Manufacturer |
| --- | --- | --- |
| Granule #1 | WA-14 calcined kaolin particle having a reflectivity ranging from about 80 to 92%. | Sedlecky Kaolin (Bozicany, Czech Republic) |
| Granule #2 | WA-11 calcined kaolin particle having a reflectivity ranging from about 80 to 92%. | AKW (Hirschau, Germany) |
| Asphalt #1 | Type AC-7 asphalt having low melting point. | Marathon Petroleum Company LLC (Findlay OH) |
| Asphalt #2 | Type III roofing asphalt. This type of asphalt is typically used in the "hot mop" built up type of roofing. | United Asphalts (Commerce City, CO) |
| Treatment #1 | SITREN 595 | Evonik Industries AG (Essen, Germany) |
| Treatment #2 | TEGO XP 5000 | Evonik Industries AG (Essen, Germany) |

TABLE 6-continued

| | Description | Manufacturer |
|---|---|---|
| Treatment #3 | SILRES BS1001A | Wacker Chemie AG (Munich, Germany) |
| Treatment #4 | SILRES BS3003 | Wacker Chemie AG (Munich, Germany) |

The treated granules for each sample were embedded in asphalt that had been heated to about 200° C. The embedded treated granules were then placed on a tray in an oven at 85° c. for 96 hours (4 days). The trays were removed from the oven, and the asphalt including the embedded granules was allowed to cool to room temperature. The granules were then evaluated for staining using an 8× magnifier/loupe. The stain values were evaluated on a pass/no pass basis and then ranked according to relative staining. The 4-Day Stain Test results are provided in Table 7 below.

TABLE 7

| Sample | Description | Pass/Fail |
|---|---|---|
| A1 | Granule #1, Treatment #1, Asphalt #1 | F |
| A2 | Granule #1, Treatment #1, Asphalt #2 | p |
| B1 | Granule #2, Treatment #1, Asphalt #1 | F |
| B2 | Granule #2, Treatment #1, Asphalt #2 | p |
| C1 | Granule #1, Treatment #2, Asphalt #1 | F |
| C2 | Granule #1, Treatment #2, Asphalt #2 | F |
| D1 | Granule #2, Treatment #2, Asphalt #1 | F |
| D2 | Granule #2, Treatment #2, Asphalt #2 | p |
| E1 | Granule #1, Treatment #3, Asphalt #1 | F |
| E2 | Granule #1, Treatment #3, Asphalt #2 | p |
| F1 | Granule #2, Treatment #3, Asphalt #1 | F |
| F2 | Granule #2, Treatment #3, Asphalt #2 | p |
| G1 | Granule#1, Untreated, Asphalt #1 | F |
| G2 | Granule#!, Untreated, Asphalt #2 | F |
| H1 | Granule#2, Untreated, Asphalt #1 | F |
| H2 | Granule#2, Untreated, Asphalt #2 | F |
| 11 | Granule #1, Treatment #4, Asphalt #1 | F |
| 12 | Granule #1, Treatment #4, Asphalt #2 | P |
| J1 | Granule #2, Treatment #4, Asphalt #1 | F |
| J2 | Granule #2, Treatment #4, Asphalt #2 | P |

The samples treated with SITREN 595, SILRES BS1001A and SILRES BS3003 showed the most favorable test results. In particular, the samples treated with SILRES BS3003 showed significantly less staining.

Example 5

Adhesion Test

The pick test is a practical test used in the roofing granule industry to predict the adhesive characteristics of roofing granules toward asphalt.

Preparation (Screening) of Particles

The standard #11 particle distribution is what was used in the following steps.

Preparation of Asphalt

Asphalt is heated to about 200° C. The fluid asphalt in poured into an aluminum tray so that the entire surface is just coated. This requires about 5 grams of asphalt per sample.

Pick Test

The asphalt is reheated on a small hotplate to about 200° C. until the asphalt becomes molten. About 25 grams of granules are broadcast across the entire surface until the entire asphalt surface has been covered. While the asphalt is still warm, the granules are pressed into the asphalt, as they would be in a production environment. Due to the rapid cooling that can take place the samples are placed into an 80° C. oven for 4 days after which time they are allowed to completely cool to room/ambient temperature.

The particles are picked out of the cooled asphalt. Only those particles which were embedded well are examined. A picked particle is examined with an 8× magnifier/loupe to estimate the amount of asphalt that was adhered to it. The granules adhesion was measured on two different elements. The first was whether the adhesion failure was due to an adhesive or cohesive failure of the asphalt. The second element was a ranked judgment of the adhesive strength, Best/Average/Poor. The Best rank required a concerted effort to remove granules. The Average rank would be compared to most current market granulated products granule adhesion. The Poor rank was the evidence of little effort required to dislodge the granule.

The results of the pick test are presented in Table 8.

TABLE 8

| Treatment .67%-2% by weight | Sample | Adhesive/ Cohesive Failure | 1 = BEST, 2 = AVG, 3 = POOR |
|---|---|---|---|
| Granule #1, Treatment #1, Asphalt #1 | AI | A | 3 |
| Granule #1, Treatment #1, Asphalt #2 | A2 | c | 1, 2 |
| Granule #2, Treatment #1, Asphalt #1 | Bl | A | 3 |
| Granule #2, Treatment #1, Asphalt #2 | B2 | A/C | 2 |
| Granule #1, Treatment #2, Asphalt #1 | Cl | A/C | 2 |
| Granule #1, Treatment #2, Asphalt #2 | C2 | A/C | 1 |
| Granule #2, Treatment #2, Asphalt #1 | Dl | A | 3 |
| Granule #2, Treatment #2, Asphalt #2 | D2 | c | 1 |
| Granule #1, Treatment #3, Asphalt #1 | El | A/C | 3 |
| Granule #1, Treatment #3, Asphalt #2 | E2 | c | 1, 2 |
| Granule #2, Treatment #3, Asphalt #1 | Fl | c | 1 |
| Granule #2, Treatment #3, Asphalt #2 | F2 | A | 3 |
| Granule#1, Untreated, Asphalt #1 | Gl | c | 2 |
| Granule#1, Untreated, Asphalt #2 | G2 | A | 3 |
| Granule#2, Untreated, Asphalt #1 | HI | A/C | 1, 2 |
| Granule#2, Untreated, Asphalt #2 | H2 | A/C | 3 |
| Granule#1, Treatment #4, Asphalt #1 | II | c | 1 |
| Granule#1, Treatment #4, Asphalt #2 | 12 | c | 1 |
| Granule#2, Treatment #4, Asphalt #1 | J1 | A/C | 1 |
| Granule#2, Treatment #4, Asphalt #2 | J2 | c | 1 |

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A cool roofing system comprising:
   at least one asphalt layer and at least one granular layer directly adhered to a top surface of the asphalt, wherein the granular layer comprises a plurality of highly reflective calcined bright white crushed kaolin particles having a solar reflectance ranging from about 80% to about 92% prior to any added surface treatment, wherein the surface treated, bright white crushed kaolin particles comprise crushed kaolin chamotte particles;
   wherein the surface treated highly reflective, calcined, bright white crushed kaolin particles have a surface treatment consisting of a clear coating,
   wherein, when the highly reflective calcined, surface treated, bright white crushed kaolin particles are applied to the asphalt layer used for roofing materials, the highly reflective calcined, surface treated, bright white crushed kaolin particles have a resultant reflectance between about 70-82% substantially covering the surface of the asphalt layer in the cool roofing system providing a minimum solar reflectance of 70% or more; and
wherein the clear coating is selected from the group consisting of silanes, siloxanes, polysiloxanes, organo-siloxanes, silicates, organic silicates, silicone resins, acrylics, urethanes, polyurethanes, glycol ethers and mixtures thereof.

2. The cool roofing system according to claim 1, wherein the clear coating comprises a solventless emulsion comprising silanes and siloxanes.

3. The cool roofing system according to claim 1, wherein the clear coating improves adherence to the highly reflective calcined, surface treated, bright white crushed kaolin particles.

4. A cool roofing system comprising:
a roofing substrate,
at least one layer of spray polyurethane foam applied to the roofing substrate,
an elastomeric coating layer applied over and adhered to the spray polyurethane foam layer,
a granular layer directly adhered to the elastomeric coating layer,
wherein the granular layer comprises a plurality of highly reflective calcined bright white crushed kaolin particles having a solar reflectance ranging from about 80% to about 92% prior to any added surface treatment, wherein the surface treated, bright white crushed kaolin particles comprise crushed kaolin chamotte particles
wherein the surface treated highly reflective, calcined, bright white crushed kaolin particles have a surface treatment consisting of a clear coating,
wherein, when the highly reflective calcined, surface treated, bright white crushed kaolin particles are applied to the elastomeric layer used for roofing materials, the highly reflective calcined, surface treated, bright white crushed kaolin particles have a resultant reflectance between about 70-82% adhered to the elastomeric layer in the cool roofing system providing a minimum solar reflectance of 70% or more; and
wherein the clear coating is selected from the group consisting of silanes, siloxanes, polysiloxanes, organo-siloxanes, silicates, organic silicates, silicone resins, acrylics, urethanes, polyurethanes, glycol ethers and mixtures thereof.

5. The cool roofing system according to claim 4, wherein a thickness of the spray polyurethane foam layer ranges from about 1 inch to about 3 inches.

6. The cool roofing system according to claim 4, wherein the elastomeric coating layer comprises any one of an acrylic, urethane or silicone.

7. The cool roofing system according to claim 4, wherein the clear coating comprises an emulsion of silanes and siloxanes.

8. The cool roofing system according to claim 7, wherein the clear coating improves adherence of the highly reflective calcined, surface treated, bright white crushed kaolin particles.

9. A cool roofing system consisting of an asphalt layer and a granular layer directly adhered to a top surface of the asphalt layer, wherein the granular layer comprises a plurality of highly reflective calcined, bright white crushed kaolin particles having a solar reflectance ranging from about 80% to about 92% prior to any added surface treatment, wherein the highly reflective, calcined, bright white crushed kaolin particles comprise crushed kaolin chamotte particles, wherein the highly reflective, calcined, bright white crushed kaolin particles are surface treated with a clear coating, and wherein, when the highly reflective, calcined, surface treated, bright white crushed kaolin particles are applied to the asphalt layer used for roofing materials, the resultant solar reflectance of the cool roofing system is between about 70-82%.

10. The cool roofing system according to claim 9, wherein the clear coating is selected from the group consisting of silanes, siloxanes, polysiloxanes, organo-siloxanes, silicates, organic silicates, silicone resins, acrylics, urethanes, polyurethanes, glycol ethers and mixtures thereof.

11. The cool roofing system according to claim 10, wherein the surface clear coating comprises a solventless emulsion comprising silanes and siloxanes.

12. The cool roofing system according to claim 11, wherein the clear coating improves adherence of the highly reflective calcined, surface treated, bright white crushed kaolin particles.

13. A cool roofing system consisting of:
a roofing substrate;
at least one layer of spray polyurethane foam applied to the roofing substrate;
an elastomeric coating layer applied over and adhered to the spray polyurethane foam layer; and
a granular layer directly adhered to the elastomeric coating layer;
wherein the granular layer comprises a plurality of highly reflective calcined, bright white crushed kaolin particles having a solar reflectance ranging from about 80% to about 92% prior to any added surface treatment, wherein the highly reflective, calcined, bright white crushed kaolin particles are surface treated with a clear coating, and wherein, when the highly reflective calcined, surface treated, bright white crushed kaolin particles are applied to the elastomeric layer used for roofing materials, the highly reflective calcined, surface treated, bright white crushed kaolin particles have a resultant reflectance between about 70-82% adhered to the elastomeric layer in the cool roofing system providing a minimum solar reflectance of 70% or more.

14. The cool roofing system according to claim 13, wherein the clear coating is selected from the group consisting of silanes, siloxanes, polysiloxanes, organo-siloxanes, silicates, organic silicates, silicone resins, acrylics, urethanes, polyurethanes, glycol ethers and mixtures thereof.

15. The cool roofing system according to claim 14, wherein the clear coating comprises a solventless emulsion comprising silanes and siloxanes.

16. A cool roofing system comprising: at least one asphalt layer and a granular layer directly adhered to a top surface of the asphalt layer, wherein the granular layer comprises a plurality of highly reflective calcined, bright white crushed kaolin particles having a solar reflectance ranging from about 80% to about 92% prior to any added surface treatment, wherein the highly reflective, calcined, bright white crushed kaolin particles comprise crushed kaolin chamotte particles, wherein the highly reflective, calcined, bright white crushed kaolin particles have a surface treatment consisting of clear coating, and wherein, when the highly reflective calcined, surface treated, bright white crushed kaolin particles are applied to the asphalt layer used for roofing materials, the highly reflective, calcined, bright white crushed kaolin particles have a resultant solar reflectance between about 70-82% substantially covering the surface of the asphalt layer in the cool roofing system providing a minimum solar reflectance of 70% or more, and wherein the clearing coating comprises a solventless emulsion comprising silanes and siloxanes.

* * * * *